J. H. GRAVELL.
WELDING MACHINE.
APPLICATION FILED JAN. 30, 1913.
1,086,041.
Patented Feb. 3, 1914.
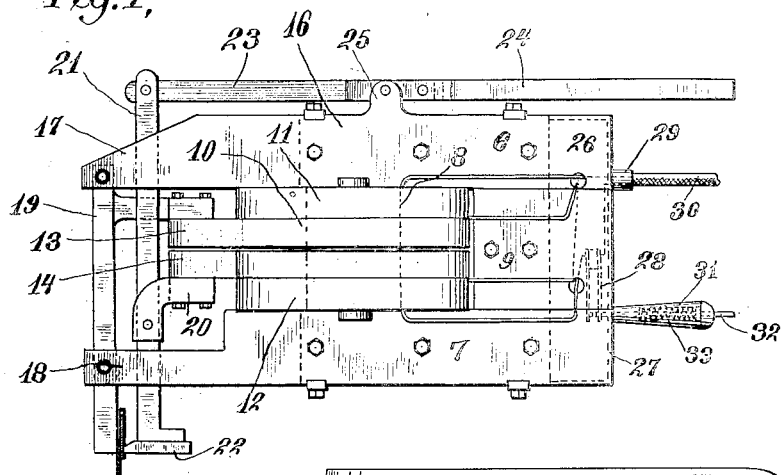
Fig. 1.
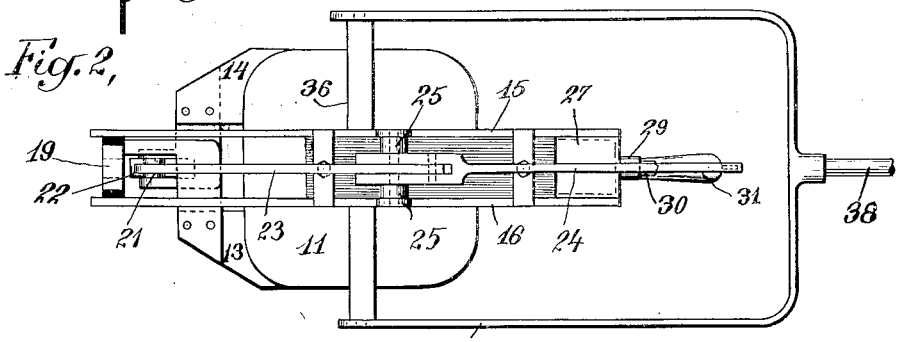
Fig. 2.
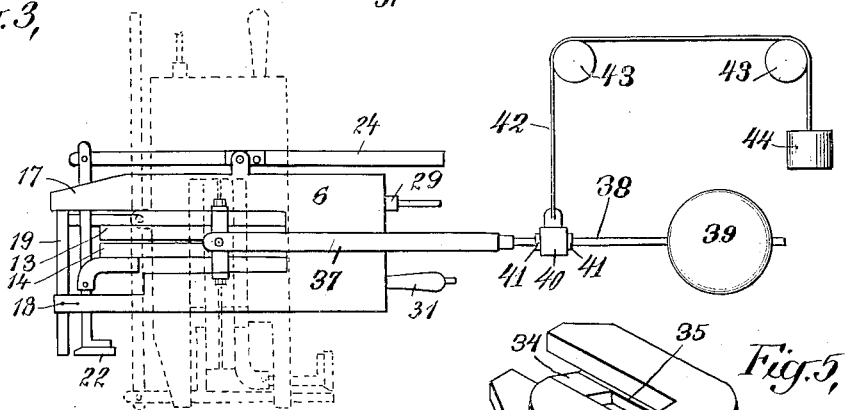
Fig. 3.
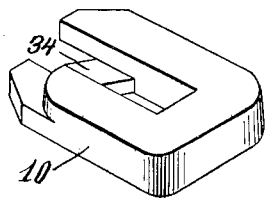
Fig. 4.
Fig. 5.
WITNESSES
J. McIntosh
J. F. Collins
INVENTOR
James H. Gravell
BY
Edmonds & Edmonds
ATTORNEYS

UNITED STATES PATENT OFFICE.

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

WELDING-MACHINE.

1,086,041.

Specification of Letters Patent.

Patented Feb. 3, 1914.

Application filed January 30, 1913. Serial No. 745,074.

*To all whom it may concern:*

Be it known that I, JAMES H. GRAVELL, a citizen of the United States, residing at Philadelphia, in the county of Philadelphia and State of Pennsylvania, have invented certain new and useful Improvements in Welding-Machines, of which the following is a specification.

This invention relates to electric welding machines, whereby welds may be effected between metallic parts by the passage of electric current therethrough.

The invention is directed primarily to the provision of a machine of this type which is portable so that the machine itself may be manipulated to properly position it with respect to the work instead of having the metallic parts to be welded positioned with respect to the machine. It is frequently desirable to weld together metallic parts one or more of which are of substantial weight and bulk, such that moving the parts incidental to effecting welds can be accomplished only with difficulty. With a welding machine specially constructed to make it portable, the machine can be moved instead of the work and a series of welds can be effected with such a machine in very much less time and hence at much less expense.

The invention also involves numerous features of improvement in the construction of the machine and the arrangements of the parts thereof. In accordance with the invention the core of the transformer is made the frame of the welding machine and the various parts constituting the machine are assembled upon this core. These parts include the primary and secondary coils of the transformer, the terminals and the means for operating the terminals to move them toward and away from each other. For this purpose the core is made up of a plurality of laminæ, and the outside laminæ are extended as is required for the necessary supports and inclosures. In this way all of the parts of the welding machine may be built up upon the core of the transformer, and the latter may also be made to provide a chamber for the reception of the electric switch by which the primary circuit is opened and closed.

Another feature of the invention resides in the construction of the secondary coil of the transformer. This secondary coil is made from a casting of metal, such as copper and is so constructed as to form a plurality of turns. To effect this the casting for the secondary is made of a special shape and certain cuts are then made in this casting so as to make the desired provision for two or more turns.

Another feature of the invention resides in the provision of means for mounting the welding machine, whereby it is adapted for movement in any direction. In the preferred embodiment of the invention, this includes the provision of certain pivotal joints, counterweights, and suspending means whereby the welding machine as a whole may be raised or lowered or moved in any direction, as may be made desirable by the character of the work which is to be done.

I have illustrated the preferred embodiment of my invention in the accompanying drawings in which:—

Figure 1 is an elevation of the machine, Fig. 2 is a top view of the same, Fig. 3 is an elevation showing the supporting means for the machine and Figs. 4 and 5 are perspective views illustrating the method of making the secondary coil.

Referring to these drawings, the machine includes a rectangular core having side members 6 and 7 and connecting members 8 and 9. The primary and secondary coils are placed upon the connecting member 8, and the core forms a circuit for the magnetic flux through these coils. The secondary 10 is a casting constructed in the manner hereinafter described and consists of two turns. The primary consists of two coils 11 and 12 wound upon the cross member 8 of the core, one coil on either side of the secondary 10. The ends of the secondary coil are extended laterally as shown at 13 and 14 for connection to the terminals between which the work is adapted to be gripped.

As shown in Fig. 2, the core of the transformer consists of a plurality of sheet-metal plates or laminæ, these being secured together by bolts passing through them as shown in Fig. 1. The two outside plates 15 and 16 are preferably made from heavier material than the intermediate plates. The portions of these outside plates constituting the side members 6 and 7 are extended laterally as shown at 17 and 18. These extensions constitute a supporting means for a welding conductor 19 which is bolted to the extensions 17 and 18 but insulated therefrom. The welding conductor 19 has an integral lateral projection which is bolted to the end 13 of the secondary coil. The lower end of the conductor 19 extends below the side member 7 of the core and this end constitutes one of the terminals of the welding machine. A second welding conductor 20 is secured to the opposite end 14 of the secondary, this conductor being of angular form as shown in Fig. 1. A swinging arm 21 is pivotally connected to the welding conductor 20. This arm lies between the two plates 15 and 16, but does not contact with them nor with the lateral projection of the welding conductor 19. The lower end of the swinging arm 21 is shaped in any suitable manner to receive and hold a welding tool 22, adapted to coact with the lower end of the welding conductor 19. The upper end of the swinging arm 21 is pivotally connected to a link 23 whose opposite end enters the bifurcated end of an operating lever 24 and is pivoted to that lever. The lever 24 is pivotally mounted in ears 25 extending upwardly from the plates 15 and 16. On the side of the machine opposite the welding conductors, the plates 15 and 16 are extended as shown at 26 beyond the ends of the intermediate plates so as to provide a chamber at this point. This chamber is closed by a member 27, preferably a casting of aluminum. In the chamber thus formed is an electric switch 28 of any suitable construction for closing and opening the circuit of the primary coils 11 and 12. The casting 27 has a bushing 29 formed integral therewith through which the wires 30 enter for connection to the coils 11 and 12 and the switch 28. The casting 27 also has a handle 31 for the machine formed integral therewith or rigidly secured thereto and the operating member 32 of the switch 28 extends through this handle 31. The member 32 is actuated by a spring 33, and is so positioned that the operator, while manipulating the machine with the handle 31, may press the member 32 so as to close the switch 28.

The two-turn secondary coil 10 is constructed in the manner illustrated in Figs. 4 and 5. In Fig. 4 is shown a casting of copper or other metal which is a good conductor. This casting is in the shape of a U with a connecting member 34 between the legs of the U and disposed at an angle so that it connects at one end with one side of the casting and at the other end with the opposite side. The casting formed as shown in Fig. 4 is then milled as indicated at 35 in Fig. 5, the cut thus provided extending entirely through the U-shaped piece, except that no cut is made in the connecting member 34. The cut having been made in this way, two U-shaped pieces are provided lying side by side and each having one leg slightly shorter than the other and the shorter leg of one U is connected to the shorter leg of the other by connecting member 34. A secondary coil is thus provided made from a casting of copper and consisting of two turns lying side by side. In a similar manner a secondary coil of more than two turns may be provided by suitably shaping the original casting and then making cuts therein, which cuts form the spaces between adjacent turns.

It will be noted that the projecting portions 26 of the plates 15 and 16 and the cover 27 form an inclosure for the switch 28 so that the switch is protected but may be readily actuated by member 32. Also, the switch 28 is close to the core of the transformer and therefore the magnetic flux which follows the core may be employed for eliminating an arc at the switch contacts. This is done by so locating the switch that any arc formed when it is opened would be transverse to the path of the magnetic flux adjacent to the core. The drawings show the switch 28 so located and as a result an arc formed when the switch is opened will be quickly broken by the magnetic flux.

The machine thus constructed is of such small size and weight in proportion to its capacity as to readily adapt it for use as a portable welding machine, such use involving movement of the machine rather than the work after the completion of one weld and when preparing to make the next. In order to facilitate such manipulation of the machine as may be necessary in making a series of welds, I prefer to provide means for mounting the machine so that it may be turned in any direction and also raised and lowered at will. Such a means for mounting the machine is shown in Figs. 2 and 3. The side plates 15 and 16 of the core have horizontally disposed trunnions 36 secured thereto and extending laterally therefrom and the ends of these trunnions are pivotally connected to the ends of a bail 37. This bail is secured to a rod 38 at the end of which is a counterweight 39. At the center of gravity of all of these parts, that is, the machine, the support therefor and the counterweight 38, is a bearing or sleeve 40 on the rod 38 and held against lateral movement on the rod by collars 41. A cord 42 is attached to the sleeve 40 and passes over the sheaves 43 and a counterweight 44 is secured to the end of this cord. The machine thus mounted is capable of universal movement. It is mounted on a universal joint as the machine may turn about the axis of the trunnions 36, about a horizontal axis passing through the connection of cord 42 to sleeve 40 and also about the axis of rod 38; also, the machine may be raised and lowered as desired, such movement being accompanied by corresponding lowering or raising of the counterweight 44.

In Fig. 3, the machine is shown horizontally disposed in full lines and turned through an angle of 90 degrees in dotted lines. The provision of this means for supporting the machine greatly facilitates manipulation of the machine and positioning it to make a weld. The machine may be conveniently manipulated for this purpose primarily by means of the handle 31 and secondarily by means of the operating handle 24. When the machine has been suitably positioned so that the parts to be welded lie between the tool 22 and the adjacent end of conductor 19, the operating handle 24 is turned on its pivot so as to draw the link 23 to the right, and thus turn the swinging arm 21 on its pivot so as to cause the tool 22 to grip the work with the requisite pressure against the conductor 19. This having been done, the operator presses the operating member 32 with the thumb of the hand which grasps the handle 31 so as to close switch 28, whereupon the circuit of the primary coils will be closed, and the welding current will flow in the secondary circuit and through the parts to be welded.

The employment of a terminal member which is pivotally connected to one end of the secondary coil is a feature of the machine herein shown and described which is of special value. It will be noted that when the operating lever 24 is turned, the terminal member 21 is swung upon its pivot so as to carry its operative end or the tool 22 carried thereby into coaction with the opposite terminal member 19 through the work. Pressure on the work exerted in this manner is accompanied by a corresponding pressure of the terminal member 21 upon its pivot-pin and pressure of the pivot-pin upon the walls of its bearing carried by the secondary. This increase in the pressure between the parts making up the secondary system at a time when the welding is being effected aids materially in cutting down the electrical resistance of the joint in the secondary system so that the current may flow therein more freely, and furthermore, it aids materially in making the resistance of the secondary circuit uniform throughout a series of welding operations, so that if the parts to be welded in a series of operations are all of substantially the same thickness and material, the time required for the welds will be the same in each instance and more uniform results will be obtained. A further advantageous feature of this construction involving the use of a pivoted terminal member is that no guides are required for the movable tool-holder and terminal member, this being of special value in a portable machine where light weight is an important consideration. The hinge joint for the terminal member is a very light joint and a simple mechanical construction which occupies but little space.

Having described my invention, what I claim as new therein and desire to secure by Letters Patent of the United States is:

1. A welding machine comprising the combination of a core, a primary coil thereon, a secondary coil on the core, a terminal mounted on the core and connected to the secondary coil, a second terminal connected to the secondary coil and means for moving the terminals toward and away from each other, substantially as set forth.

2. A welding machine comprising the combination of a core, a primary coil thereon, a secondary coil on the core, a terminal mounted on the core and connected to the secondary coil, a second terminal connected to the secondary coil, and operating means mounted on the core and connected to one of said terminals for moving the terminals toward and away from each other, substantially as set forth.

3. A welding machine comprising the combination of a core, a primary coil thereon, a secondary coil on the core, a terminal rigidly secured to the core and connected to the secondary coil, a second terminal pivotally connected to the secondary coil, and means for moving said pivoted terminal about its pivot to carry it into and out of coaction with the rigidly mounted terminal, substantially as set forth.

4. A welding machine comprising the combination of a core, a primary coil thereon, a secondary coil on the core, a terminal rigidly secured to the core and connected to the secondary coil, a second terminal pivotally connected to the secondary coil, and operating means mounted on the core and connected to said second terminal for turning the latter on its pivot to carry it into and out of coaction with the rigidly mounted terminal, substantially as set forth.

5. A welding machine comprising the combination of a core, a primary coil thereon, a secondary coil on the core, terminals on one side of the machine movable toward and away from each other and in electrical connection with the secondary coil and two handles on the other side of the machine connected to the machine for positioning the same, one of which handles is connected to one of said terminals and is adapted to move the same, substantially as set forth.

6. A welding machine comprising the combination of a core, a primary coil thereon, a secondary coil on the core, terminals on one side of the machine connected to the secondary coil and movable toward and away from each other, two handles on the other side of the machine one of which is arranged to move one of said terminals, an electric switch connected in the circuit of said primary coil and an operating device for said switch located adjacent to one of said handles, substantially as set forth.

7. A welding machine comprising the combination of a core, primary and secondary coils thereon, two plates secured to the core on opposite sides thereof and projecting beyond the core, and a welding conductor secured to the projecting portions of said plates and connected to the secondary coil, substantially as set forth.

8. A welding machine comprising the combination of a core, primary and secondary coils thereon, two plates secured to the core on opposite sides thereof, two terminals, and an operating handle mounted on said plates and connected to one of said terminals for moving the same toward and away from the other terminal, substantially as set forth.

9. A welding machine comprising the combination of a core, primary and secondary coils thereon, two plates secured to the core on opposite sides thereof and projecting beyond the core, a welding conductor rigidly secured to the projecting portions of said plates and connected to the secondary coil, a pivoted welding conductor coöperating with said conductor, and an operating handle mounted on said plates and connected to said pivoted conductor, substantially as set forth.

10. A welding machine comprising the combination of a core, primary and secondary coils thereon, two plates secured to the core and projecting beyond the same, terminals connected to the secondary coil and movable toward and away from each other, a cover-plate coacting with the projecting portions of said plates to form an inclosure, a switch located in said inclosure and connected in the circuit of the primary coil, and an operating device for the switch, substantially as set forth.

11. A welding machine comprising the combination of a core, primary and secondary coils thereon, terminals connected to the secondary coil and movable toward and away from each other, and a switch in the circuit of the primary coil so located with reference to said core that the arc formed on breaking the circuit will be transverse to the path of the magnetic flux adjacent to the core, substantially as set forth.

12. In a welding machine, a transformer having a secondary consisting of two turns of uniform cross-section throughout, said secondary comprising two U-shaped members each having one leg longer than the other, and said members being disposed side by side with the longer leg of one opposite the shorter leg of the other and a connecting member extending between and integral with the ends of the shorter legs of the U-shaped members, substantially as set forth.

13. A portable welding machine comprising the combination of a core, a primary and secondary coil thereon, terminals connected to the secondary and movable toward and away from each other and means for mounting the machine permitting movement thereof about two horizontal axes one at an angle to the other, substantially as set forth.

14. A portable welding machine comprising the combination of a core, a primary and secondary coil thereon, terminals connected to the secondary and movable toward and away from each other and means for mounting the machine permitting movement thereof about three different horizontal axes, substantially as set forth.

15. A portable welding machine comprising the combination of a core, a primary and secondary coil thereon, terminals connected to the secondary and movable toward and away from each other and supporting means for the machine permitting vertical movement of the machine and movement thereof about two different horizontal axes, substantially as set forth.

16. A portable welding machine comprising the combination of a core, a primary and secondary coil thereon, terminals connected to the secondary and movable toward and away from each other, a support upon which the machine is mounted to turn about three different horizontal axes and means for raising and lowering the support, substantially as set forth.

17. A portable welding machine comprising the combination of a core, a primary and secondary coil thereon, terminals connected to the secondary and movable toward and away from each other, a counterweighted frame on which the machine is mounted on a universal joint and means for suspending said frame from a counterweight, substantially as set forth.

18. A portable welding machine comprising the combination of a core, primary and secondary coils thereon, terminals connected to the secondary and movable toward and away from each other, a support upon which the machine is mounted and which is movable about a horizontal axis, and means for suspending said support permitting vertical movement of the support and the machine carried thereby, substantially as set forth.

19. A welding machine comprising the combination of a core, primary and secondary coils mounted thereon, terminals connected to the secondary and movable relatively toward and away from each other, and a switch mounted on the core and connected in the circuit of the primary coil, substantially as set forth.

20. A welding machine comprising the combination of a core, primary and secondary coils mounted thereon, terminals connected to the secondary and movable relatively toward and away from each other, a switch-box secured to said core and a switch mounted within the box and connected in the circuit of the primary coil, substantially as set forth.

21. A welding machine comprising the combination of a core, primary and secondary coils thereon, terminals connected to the secondary coil and one of which is movable, a handle pivotally mounted upon the core and a link pivotally connected to said handle eccentric to the pivot of the latter and also connected to the movable terminal, substantially as set forth.

22. A portable welding machine comprising the combination of a core and primary and secondary coils associated therewith which together form the framework of the machine, terminals located upon one side of the machine, one of them connected rigidly to one end of the secondary coil and the other pivotally connected to the other end of said coil, and a handle located at the other side of the machine and connected to the movable terminal for turning the same on its pivot, substantially as set forth.

23. A portable welding machine comprising the combination of a core and primary and secondary coils associated therewith which together form the framework of the machine, terminals located upon one side of the machine and one of which is movable toward and away from the other, and a handle pivotally mounted upon said framework and projecting upon the other side of the machine and connected to the movable terminal for operating the same, substantially as set forth.

24. A portable welding machine comprising the combination of a core and primary and secondary coils associated therewith which together form the framework of the machine, a terminal upon one end of the secondary coil in electrical connection therewith, a second terminal pivotally mounted upon the other end of the secondary coil, and an operating device mounted on said framework and connected to said second terminal for turning the latter on its pivot to carry it into and out of coaction with the rigidly mounted terminal, substantially as set forth.

25. In a welding machine, the combination of a rigid secondary coil of conducting material, a primary coil and core associated therewith, a terminal member connected to one end of the secondary coil, a second terminal member pivotally mounted upon the other end of the secondary coil by means of a pivot-pin of conducting material, and means for turning said pivoted member about its pivot to carry it into and out of coaction with the other terminal member, substantially as set forth.

26. In a welding machine, the combination of a rigid secondary coil of conducting material having its ends projecting, a primary coil and a core associated therewith, a rigidly mounted terminal member connected to one end of the secondary coil, a second terminal member pivotally mounted on the other end of the secondary coil by means of a pivot-pin of conducting material and means for turning said pivoted member about its pivot to carry it into and out of coaction with the rigidly mounted terminal, substantially as set forth.

27. In a welding machine, the combination of a rigid secondary coil of conducting material having its ends projecting, a primary coil and a core associated therewith, a terminal member rigidly mounted on one end of the secondary and extending at an angle thereto, a second terminal member extending across the other end of the secondary and pivotally connected thereto by means of a pivot-pin of conducting material, and means for subjecting the pivoted terminal to pressure tending to turn it on its pivot to carry one end thereof into coaction with the other terminal member through the work, substantially as set forth.

28. A portable welding machine comprising the combination of a core, a primary coil and a secondary coil which together form the framework of the machine, terminals on one side of the machine, connected to the secondary coil and movable relatively toward and away from each other, two handles mounted on said framework on the other side of the machine for positioning the machine relatively to the work and means operated by one of said handles for moving one of said terminals relatively to the other, substantially as set forth.

29. A welding machine comprising the combination of a rigid secondary coil, a primary coil and core associated therewith, a terminal member pivotally mounted on one end of the secondary coil, a second terminal member connected to the other end of the secondary coil and means for acting upon the pivoted terminal member to force it against the other terminal member through the work and cause the pivoted terminal member to press upon its connection to the secondary with equal pressure, substantially as set forth.

30. A welding machine comprising the combination of a rigid secondary coil, a primary coil and core associated therewith, a terminal member connected to one end of the secondary coil, and a second terminal member pivotally connected to the other end of the secondary coil intermediate its ends and adapted to coact with the first-named terminal member at one end, and means connected to the pivoted terminal member on the side of its pivot opposite said end for moving the member about its pivotal connection to the secondary coil, substantially as set forth.

This specification signed and witnessed this 27th day of January, 1913.

JAMES H. GRAVELL.

Witnesses:
WM. J. EARNSHAW,
JOHN B. KILBURN.